United States Patent [19]
Johnson

[11] Patent Number: 5,786,673
[45] Date of Patent: Jul. 28, 1998

[54] ELECTRIC MOTOR

[75] Inventor: Ronald A. Johnson, Effingham, Ill.

[73] Assignee: Johnson Consulting, Inc., Effingham, Ill.

[21] Appl. No.: 889,119

[22] Filed: Jul. 7, 1997

Related U.S. Application Data

[63] Continuation-in-part of Ser. No. 524,261, Sep. 6, 1995, Pat. No. 5,661,379.

[51] Int. Cl.$^6$ .................................................. H02P 5/00
[52] U.S. Cl. ........................ 318/139; 318/293; 318/496; 318/503; 318/772
[58] Field of Search .............................. 318/139, 293, 318/494–498, 503, 727, 768, 772

[56] References Cited

U.S. PATENT DOCUMENTS

| | | | |
|---|---|---|---|
| 1,189,296 | 7/1916 | Scheibe . | |
| 2,900,588 | 8/1959 | Ramer . | |
| 3,697,840 | 10/1972 | Koch | 318/138 |
| 3,781,616 | 12/1973 | Mokrytzki et al. . | |
| 3,860,858 | 1/1975 | Nola . | |
| 4,103,212 | 7/1978 | Spradling . | |
| 4,161,680 | 7/1979 | Akamatsu | 318/722 |
| 4,322,665 | 3/1982 | Landgraf | 318/774 |
| 4,866,321 | 9/1989 | Blanchard et al. | 310/112 |
| 5,134,332 | 7/1992 | Nakamura et al. | 310/208 |
| 5,182,508 | 1/1993 | Schauder | 318/801 |
| 5,352,964 | 10/1994 | Nakamura et al. | 318/772 |
| 5,574,342 | 11/1996 | Okamoto | 318/254 |

*Primary Examiner*—Bentsu Ro
*Attorney, Agent, or Firm*—Knechtel, Demeur & Samlan

[57] ABSTRACT

A fractional-power electric motor is provided to generate varying amounts of output torque supplied to a driven member over a wide range of RPM speeds so as to reduce power consumption on a battery-powered source. The electric motor includes a rotor and a stator assembly. The stator assembly is disposed around the rotor and is inductively coupled to the rotor. The stator assembly further includes a plurality of poles, each having a main winding and at least one fractional-power winding. The main winding and associated at least one fractional-power winding on each of the stator poles are wound so that the magnetic fluxes generated therefrom are added. Power switching circuits are provided for independently energizing the main and fractional-power windings on each of the stator poles. A controller is used to control selectively the frequency and duty cycle energization of the power switching circuits to vary the rotational speed of the rotor and the amounts of torque supplied to the driven member.

16 Claims, 6 Drawing Sheets

Main and Fractional Power Winding Drive Circuits

Winding Driver Circuit Timing Diagram

Full Power Driver Output Timing Diagram

Full Power Driver Output Timing Diagram

Generated torque to RPM of a conventional AC induction motor.

Mechanism torque load to mechanism speed (MPH) on motor during acceleration.

ELECTRIC MOTOR

CROSS REFERENCE TO RELATED APPLICATION

This application is a continuation in part of U.S. application Ser. No. 08/524,261 filed Sep. 6, 1995, now U.S. Pat. No. 5,661,379.

BACKGROUND OF THE INVENTION

1. Field of the Invention

This invention relates generally to battery-powered electric drive systems for use in electric vehicles, tractors, etc. where the mechanism can develop momentum. More particularly, it relates to an improved electric 3-phase AC-induction motor and driver system for a vehicle which includes a unique stator construction so as to provide on-command variable torque control at any constant RPM for the purposes of improving motor efficiency over a wide range of operating speeds and reducing power consumption.

2. Description of the Prior Art

As is generally known in the art, battery-powered electric drive systems in recent years have been limited to small vehicles with typically a single large electric motor with conventional stator winding construction which is connected through a speed control circuit to the battery power source. These conventional motors are generally driven by single phase or multiple phase driver circuits where the generated output will be loaded by all of the motor's windings.

Applicant's prior co-pending application, identified above, includes an extensive discussion of the prior art and identification of prior art patents and publications. This discussion and all of the identified patents and publications are incorporated herein by reference. So, too, the entire disclosures of the prior co-pending application and all references cited by the Examiner in the prior application are incorporated by reference herein.

The problem addressed by applicant's inventions is that the instantaneous speed in miles per hour (MPH) of a vehicle is related to motor revolutions per minute (RPM) by the following equation $$MPH = \frac{RPM \times (\text{gearing ratio}) \times (\text{wheel circumference in feet}) \times 60 \frac{\text{minutes}}{\text{hour}}}{5280 \frac{\text{feet}}{\text{miles}}}$$

Thus, at any selected gearing ratio, vehicle speed is proportional to motor RPM. But in any vehicle, the motor system must be capable of generating a relatively high amount of torque initially to accelerate the vehicle. When the vehicle reaches cruising speed, the momentum of the vehicle reduces the amount of motor torque needed to maintain a constant cruising speed. In diesel or cylinder motor powered vehicles, this adjustment is provided by a combination of manual (foot pedal) control of motor RPM and by adjustable gear ratios (either manual or automatic).

In electric-powered vehicles, these adjustments are not usually feasible. Gear ratios might be adjustable based on speed, but a manual adjustment of power to an electric motor to change its torque could lead to catastrophic failure. But once an electric-powered vehicle reaches a cruising speed, the momentum of the vehicle will reduce the amount of motor torque needed to maintain the constant speed. This may be as low as 8% of the acceleration torque or even lower. To maintain a constant speed of the vehicle, the motor must also maintain a constant speed and while the torque reduction will decrease the power consumption, the motor's efficiency will also substantially decrease at these low torque, high speed levels. Single motor driver circuits do have the ability to duty cycle the motor's energization. However, the driver will still be loaded by all of the motor's windings, limiting the effectiveness of control of the motor's efficiency.

Overall, these problems greatly reduce the driving range of electric vehicles, causing frequent battery recharging and/or replacement. It is also a major obstacle to the development and acceptability to users of electric-powered vehicles such as passenger cars, trucks, tractors, etc.

This invention solves this problem because with it at any constant RPM, the amount of generated torque (which is proportional to generated horsepower) can be varied and reduced on command of the control circuits to provide only the amount of torque needed to maintain the constant speed of the vehicle while also maintaining a high efficiency. This will result in a reduction of power consumption to perhaps less than 20% of the maximum power available from the limited power source and an increase in the vehicle's average available mileage.

SUMMARY OF THE INVENTION

Accordingly, it is a general object of the present invention to provide an improved electric motor and driver system to control the amount of generated torque at any constant speed so as to significantly increase motor efficiency and reduce power consumption.

It is also an object of the present invention to provide an improved electric motor which includes a unique stator construction whereby each pole within each phase will include at least one main winding of substantial horsepower capability and at least one fractional-power winding with a fraction of the horsepower of the main winding. When combined, the magnetic fields of the main winding and the fractional power winding will add to a maximum level.

It is another object of the present invention to provide an improved electric motor which includes a unique stator winding connection where both ends of all polar main and fractional-power windings are independent and connected to H-bridge drivers so that each winding can be independently driven to either polarity and have duty cycles independent of one another.

In accordance with a preferred embodiment of the present invention, an AC induction motor is provided which can generate variable levels of torque at any constant RPM to a driven member over a wide range of RPM speeds so as to reduce power consumption to the power source. The motor includes a rotor having an axis of rotation and a stator assembly which is disposed around the rotor and is inductively coupled to the rotor. The stator assembly has a plurality of poles, each of the stator poles in each phase consists of at least one main winding of significant horsepower and at least one fractional power winding with a fraction of the horsepower of the main winding.

The main winding and the associated fractional power winding or windings within each of the stator poles and phases are wound to be essentially in phase with each other so that the magnetic flux generated in each of said windings will add to produce an increased magnetic field strength. Alternatively, because each of the windings is independently driven from the other, a substantial variety of magnetic field strengths can be generated by de-energizing one or a combination of the windings in their independent duty cycles.

For example, a fractional-power winding can be driven to 100% of its field strength while the associated main winding can be driven from 10% to 90% of its field strength.

A microprocessor controller is used to input the RPM of the motor, the MPH speed of the vehicle, the throttle level and other necessary signals to determine the required pulse width modulated (PWM) frequency to generate the required motor RPM. The controller will also determine the combination of windings and required duty cycles that is needed to generate the necessary amount of required torque to drive the power train of the vehicle for an acceptable level of performance to maintain the highest possible efficiency and lowest possible power consumption.

BRIEF DESCRIPTION OF THE DRAWINGS

These and other objects and advantages of the present invention will become more fully apparent from the following detailed description when read in conjunction with the accompanying drawings in which like reference numerals indicate corresponding parts throughout, wherein.

DESCRIPTION OF THE PREFERRED EMBODIMENT

Figure 1:
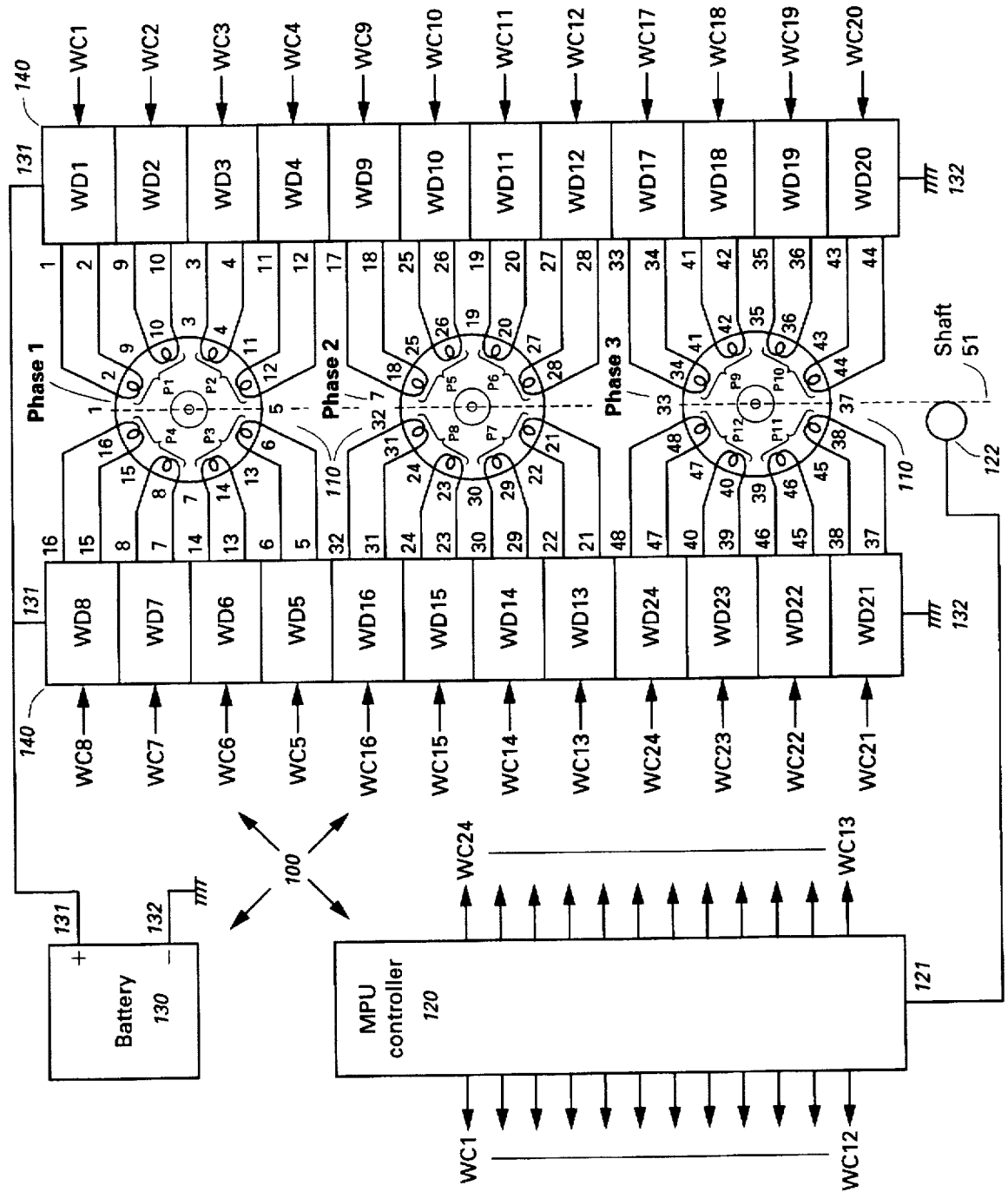
FIG. 1 is a simplified block diagram of an apparatus for controlling torque at any constant speed for an electric motor, constructed in accordance with the principles of the present invention.
Figure 2:
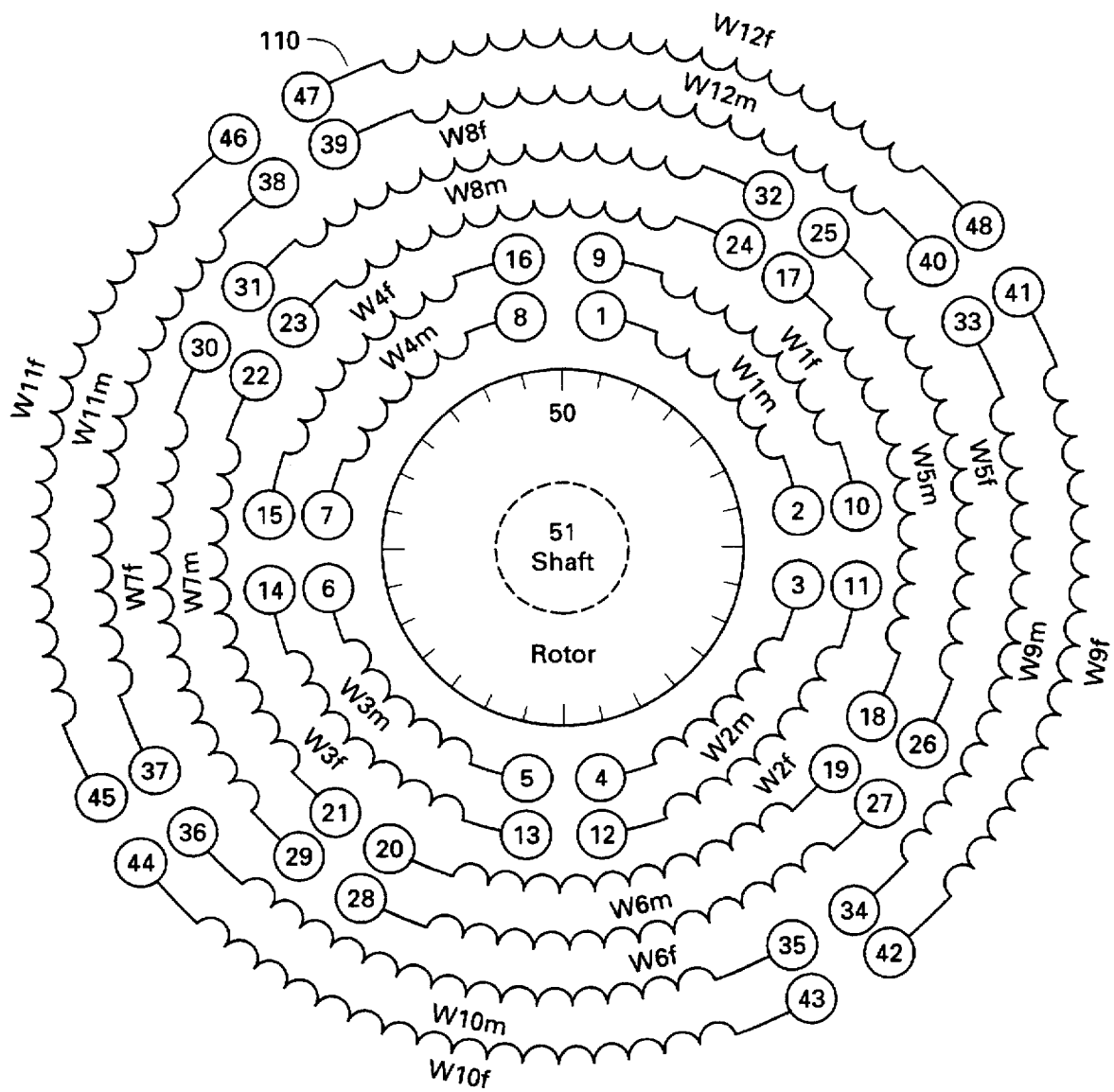
FIG. 2 is a circuit diagram of the polar placement of the windings for a 3-phase electric motor of the present invention for use in FIG. 1.

Referring now in detail to the drawings, there is shown in FIG. 1 a simplified block diagram of an apparatus 100 for an electric motor 110 for controlling the amount of torque generated at any constant speed which is constructed in accordance with the principles of the present invention. In FIG. 2, there is shown a simplified circuit diagram of the electric motor 110 of FIG. 1 which includes a rotor 50 mounted on a shaft 51 and a stator assembly having four poles within each of the 3 phases, for a total of 12 poles P1-P12. Each pole within each phase is preferably spaced from adjacent poles around rotor 50 by 90 mechanical degrees, and each pole includes a main winding (W1m-W12m) and at least one fractional-power winding (W1f-W12f). This is exemplary because broadly the invention is applicable to a motor having two, three, four or more than four poles.

In the electric motor 110 of FIGS. 1 and 2, used to explain the invention, in the first phase of windings, the first Pole P1 includes a main winding W1m and a fractional-power winding W1f, the second pole P2 includes a main winding W2m and a fractional-power winding W2f, the third pole P3 includes a main winding W3m and a fractional-power winding W3f, and the fourth pole P4 includes a main winding W4m and a fractional-power winding W4f. In the second phase of windings, the first pole P5 includes a main winding W5m and a fractional-power winding W5f, the second pole P6 includes a main winding W6m and a fractional-power winding W6f, the third pole P7 includes a main winding W7m and a fractional-power winding W7f, and the fourth pole P8 includes a main winding W8m and a fractional-power winding W8f. In the third phase of windings, the first pole P9 includes a main winding W9m and a fractional-power winding W9f, the second pole P10 includes a main winding W10m and a fractional-power winding W10f, the third pole P11 includes a main winding W11m and a fractional-power winding W11f, and the fourth pole P12 includes a main winding W12m and a fractional-power winding W12f. As disclosed herein, all of the twenty-four windings are independently energized of one another.

The apparatus 100 of FIG. 1 as shown includes power switching circuits 140 formed of a plurality of independent winding drive circuits WD1-WD24. In the first phase, the winding drive circuit WD1 has its power output terminals 1 and 2 connected across the main winding W1m, the winding drive circuit WD2 has its power output terminals 9 and 10 connected across the fractional-power winding W1f associated with the first pole P1. The winding drive circuit WD3 has its power output terminals 3 and 4 connected across the main winding W2m, and winding drive circuit WD4 has its power output terminals 11 and 12 connected across the fractional-power winding W2f associated with the second pole P2. Similarly, this pattern continues with winding drive circuits WD5 and WD6 driving windings W3m and W3f for pole P3, and WD7 and WD8 driving windings W4m and W4f for pole P4. In the second phase, the pattern continues with winding drive circuits WD9 through WD15 driving main and fractional-power windings W5m through W8f for poles P5 through P8. In the third phase, the pattern continues with winding drive circuits WD16 through WD24 driving main and fractional-power windings W9m through W12f for poles P9 through P12.

In each of the twelve stator poles, P1 through P12, the main and fractional-power windings are positioned and wound in the same sense or direction relative to each other so that the magnetic flux created in the fractional-power winding will be added to the magnetic flux created in the main winding for increased magnetic field strength. Further, in this example, the number of turns on the fractional-power windings in each pole are made to be less than the number of turns on the respective main windings to provide less horsepower. The reduced horsepower size of the fractional-power windings is determined by a ratio of the highest to lowest torque levels of operation for the specific mechanism and application.

Each of the winding drive circuits WD1-WD24 has its positive input terminal (see FIG. 3) connected to the positive output terminal 131 of the battery 130 and its negative input terminal 132 connected to the ground potential so as to receive electric power from the battery. A microprocessor-based controller 120 includes a central processing unit and program memory such as a ROM in order to generate drive signals on lines WC1-WC24 to control the respective winding drive circuits WD1-WD24. A rotational speed sensor 122 is provided to detect the rotational speed of the electric motor which is fed back to the controller 120 via line 121.

Using this information, the controller 120 further controls the rotational speed of the rotor 50 by adjusting the drive frequency and controls the amount of torque generated in the rotor to a driven member by selectively varying the duty cycle and/or de-energizing the drive signals applied to the respective winding drive circuits WD1-WD24 in accordance with programmed instructions contained within the read-only-memory ROM. The reference above to a ROM (or any other specific component, i.e., transistors) only refers to the present state of the art and other devices, either older or not yet invented which perform similar functions, could also be used.

Figure 3:
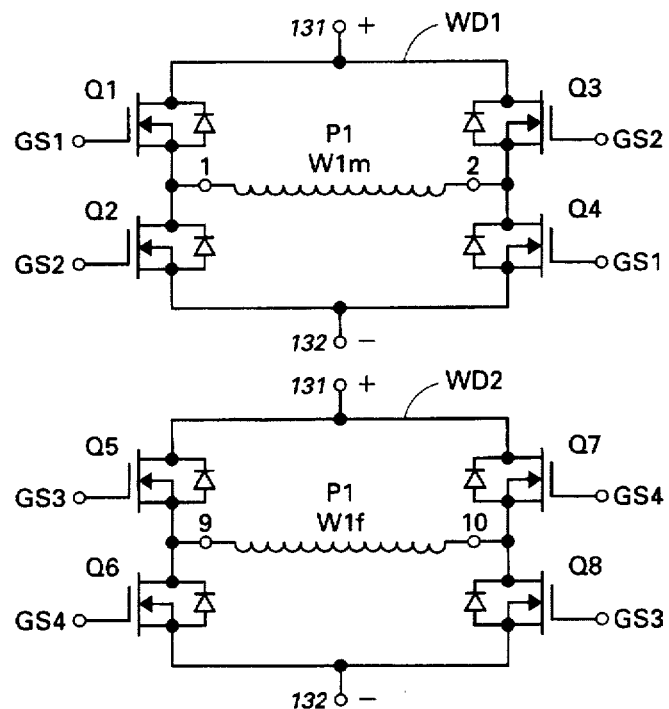
FIG. 3 is a schematic circuit diagram of the H-bridge winding drive circuits for the main and fractional-power windings of FIG. 2.

Since each of the winding drive circuits WD1-WD24 are identical in their construction and operation, it will be sufficient to describe in detail only one of the winding drive circuits, which as shown in FIG. 3 is circuit WD1. The schematic circuit diagram of winding drive circuit WD1 is formed of an array of gate-controlled power MOS field-effect transistors Q1, Q2, Q3, and Q4 connected in a H-bridge network. The source input terminals 131 and 132 of the drive circuit WD1 are connected across the battery source 130. The drive signals on the line WC1 from the microprocessor-based controller 120 are applied to the gates of the respective transistors Q1-Q4 via gate terminals GS1 and GS2 so as to cause them to turn On and Off in accordance with the programmed instructions. As a result, a pulse width modulation of the battery voltage simulates an AC waveform to drive the main winding W1m.

Figure 4:
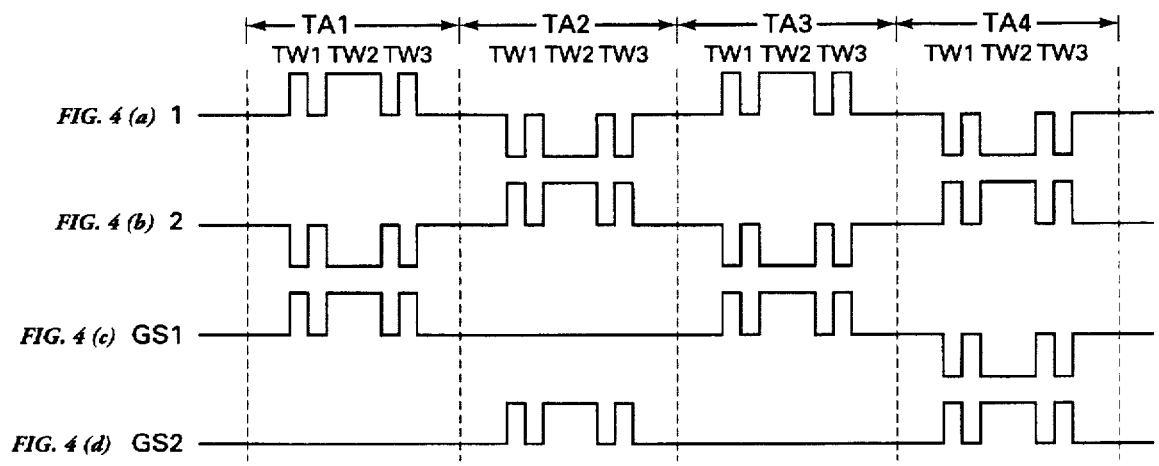
FIGS. 4(a)–4(d) are timing diagrams, illustrating the voltage waveforms applied to the gates of the H-bridge driver transistors and the associated output of driver WD1 in FIG. 3.
Figure 5:
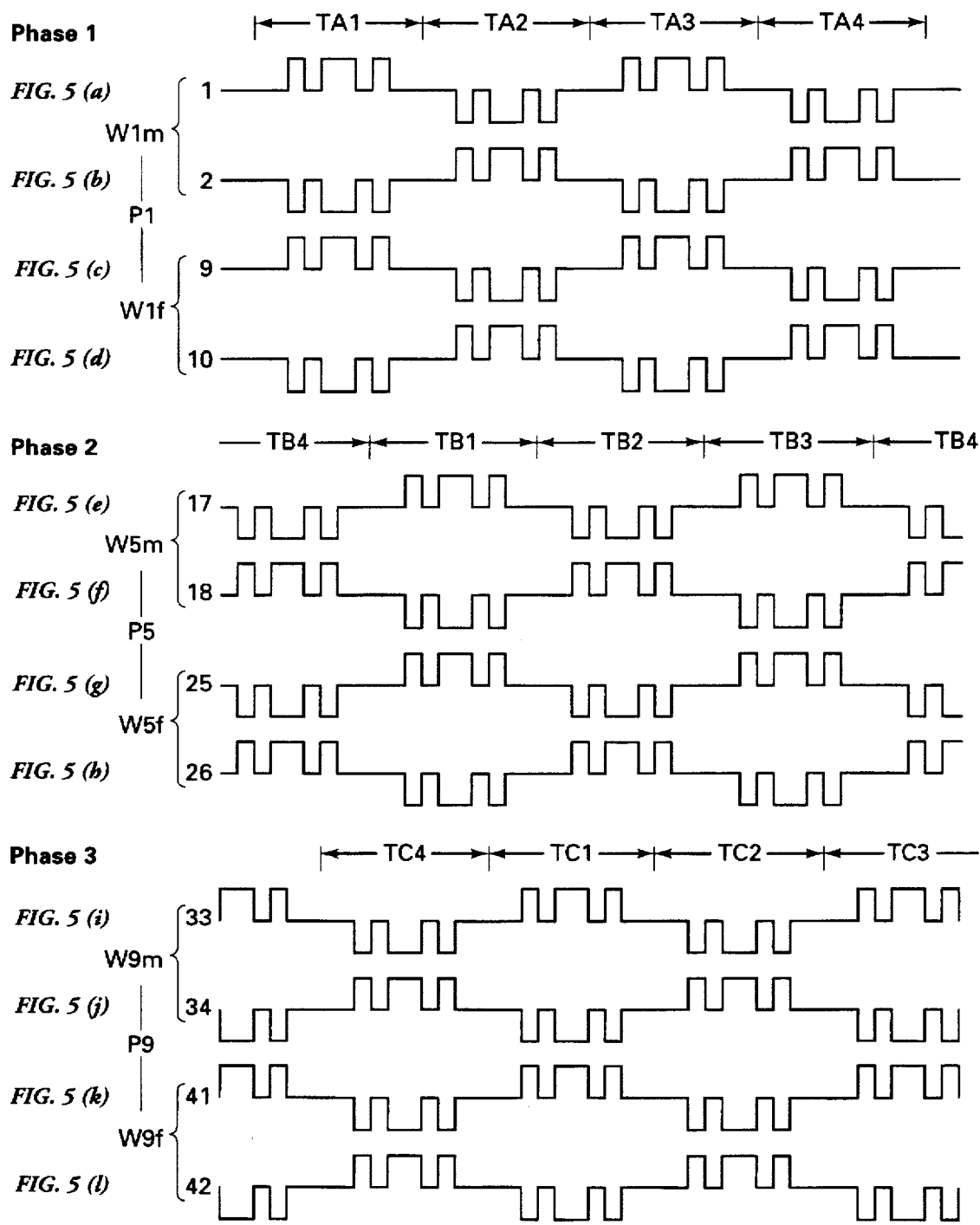
FIGS. 5(a)–5(l) are timing diagrams, illustrating the waveforms generated at the output terminals of the windings in FIG. 2, with the duty cycle of the square waves being controlled to develop full torque operation.
Figure 6:
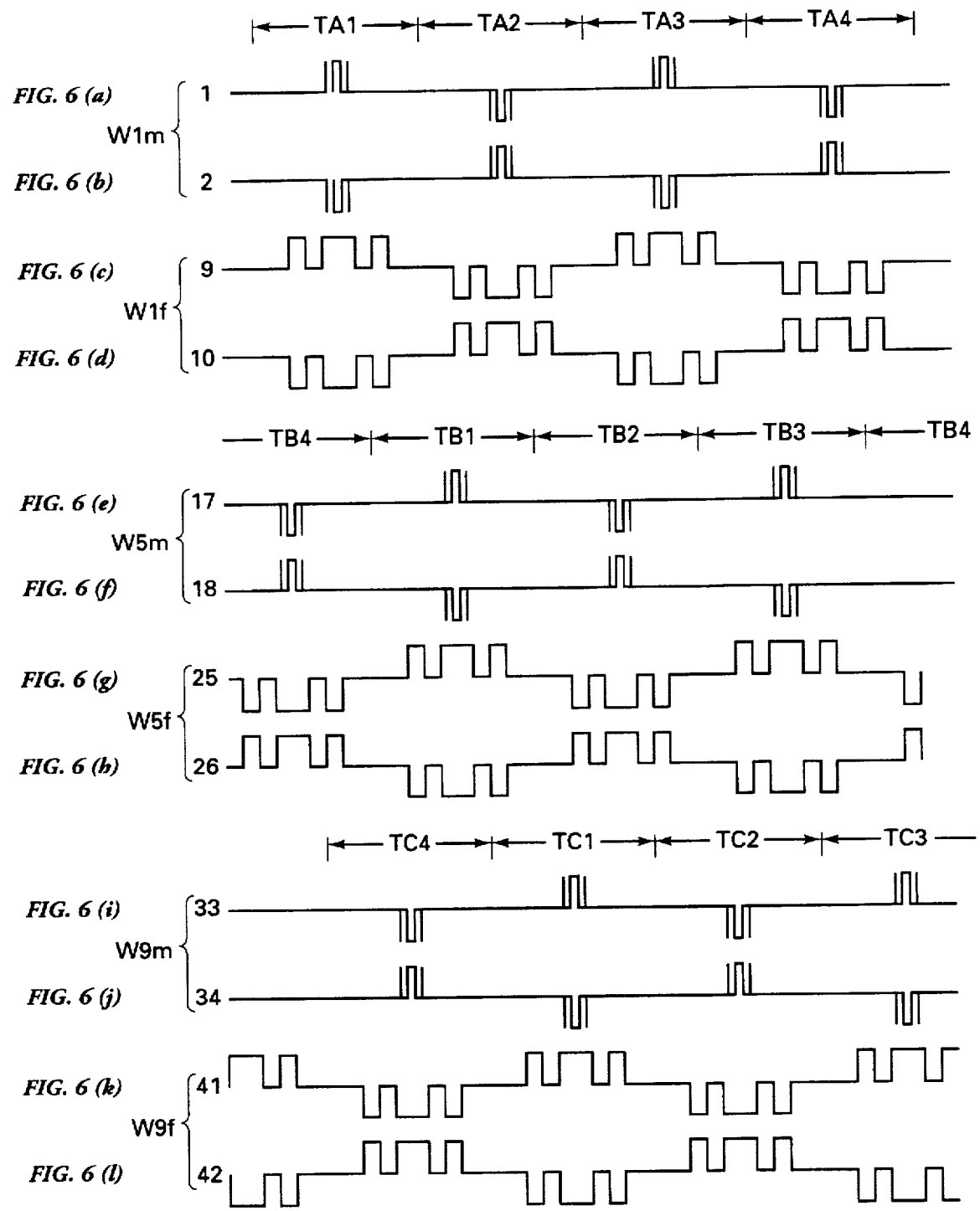
FIGS. 6(a)–6(l) are timing diagrams similar to FIGS. 5(a)–5(l), with the duty cycle of the square waves being controlled to develop a reduced torque output.

The operation of the winding drive circuit of FIG. 3 will now be explained in detail with reference to the timing diagrams in FIGS. 4(a)–4(d). In FIG. 4(c), the positive pulses during the time duration TA1 applied to the gate terminal GS1 will cause the paired transistors Q1 and Q4 to be turned on so that current flow is conducted from the voltage source 131, through the transistor Q1 to the output terminal 1, through the main winding W1m to the output terminal 2, and through the transistor Q4, thereby producing a positive magnetic field in the first pole P1. Then, the transistors Q1 and Q4 are turned off and the transistors Q2 and Q3 are turned on by the positive pulses during the time duration TA2 applied to the gate terminal GS2, as illustrated in FIG. 4(d). As a result, a current flow is conducted from the voltage source 131, through the transistor Q3 to the output terminal 2, through the main winding W1m to the output terminal 1 and through the transistor Q2, thereby developing a negative magnetic field in the first pole P1. The resultant voltage waveforms at the respective output terminals 1 and 2 are illustrated in FIGS. 4(a) and 4(b). The pulse widths Tw1, Tw2, and Tw3 of the successive positive pulses in the one-half cycle TA1 and the successive negative pulses in the one-half cycle TA2 are varied approximately to the voltage potential of a sinusoidal A.C. waveform and will vary depending upon the duty cycle needed for the power level of the particular winding to produce the desired torque output.

In FIGS. 5(a)–5(l), there are shown timing diagrams of the voltage waveforms to simulate 3-phase AC power so as to generate full power rotation of the rotor 50. FIGS. 5(a) through 5(d) represent the first phase 100% duty cycle drive voltage for windings W1m and W1f for pole P1, FIGS. 5(e) through 5(h) represent the second phase 100% duty cycle drive voltage for windings W5m and W5f for pole P5 and FIGS. 5(i) through 5(l) represent the third phase 100% duty cycle drive voltage for windings W9m and W9f for pole P9. With equal and the appropriate polarity drive voltages applied to the remaining windings, maximum torque rotation of the rotor 50 can be achieved.

As can be seen from FIGS. 5(a) through 5(d), the main winding W1m and the fractional-power winding W1f of the first pole P1 are both driven in the time duration TA1 to produce a maximum positive magnetic field. During the same time interval, the main winding W5m and the fractional-power winding W5f of pole P5 are both driven to the descending cycle of phase 2 to produce a negative magnetic field, as depicted in FIGS. 5(e) through 5(h). Also during the time duration of TA1, the main winding W9m and the fractional-power winding W9f of pole P9 are both driven to the changing cycle of phase 3 to produce a falling positive magnetic field, as depicted in FIGS. 5(i) through 5(l). The three overlapping magnetic fields will react with the induced magnetic regions of rotor 50, resulting in a ¼ turn of the rotor.

In the time duration of TA2, the main winding W1m and the fractional-power winding W1f are both driven to a maximum negative magnetic field strength while main winding W5m and fractional-power winding W5f are driven to the positive magnetic field of phase 2 and main winding W9m and fractional-power winding W9f are driven to falling negative field of phase 3. Again, with equal and the appropriate polarity drive voltages to the remaining windings, the resulting magnetic fields will cause another ¼ turn of the rotor 50.

With the magnetic fields generated in time duration TA3, the rotor will rotate another ¼ turn and likewise with time duration TA4. By repeating the drive cycles TA1 through TA4, the rotor 50 will turn at the speed of the drive frequency. By driving all windings of all poles P1 through P12 at maximum duty cycle, maximum torque will also be generated.

Figure 7:
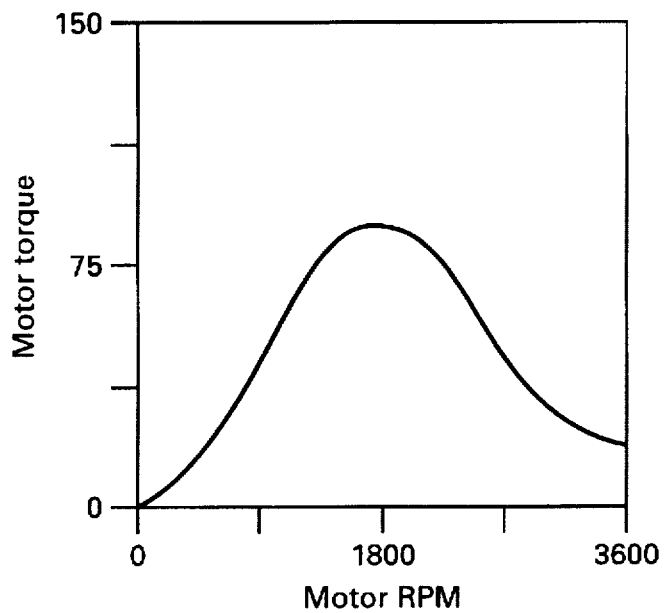
FIG. 7 is a graph of motor torque versus motor RPM speed for a conventional AC induction motor.

In FIG. 7, there is shown a graph of generated motor torque against motor RPM of a conventional AC induction motor. The graph shows that as the motor's RPM is varied, the amount of generated torque also varies. It is also noted, that at any constant RPM, the amount of generated torque is also constant. However, as a driven mechanism obtains a constant or cruising speed, the inertia, due to the mass of the driven mechanism and the gearing ratio of the associated transmission, will tend to reduce the torque load on the driving motor.

Figure 8:
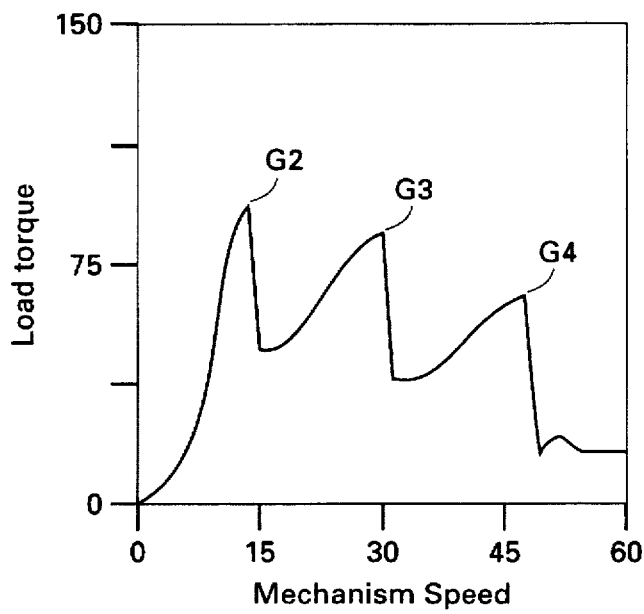
FIG. 8 is a graph of load torque versus mechanism speed for the electric motor of FIG. 2.

In FIG. 8 there is shown an exemplary graph of the torque load on the electric motor against the drive mechanism speed during acceleration from zero to 60 MPH with this invention. As indicated, the acceleration torque load increases to the maximum level indicated by G2, where a four speed transmission shifts to second gear. The high torque load continues as the mechanism increases speed and shifts through the remaining gears G3 and G4. However, as the acceleration decreases, the torque load will also decrease and when the drive mechanism reaches a constant operating speed, the torque load on the motor is substantially reduced by more than 80% to 90%.

In view of this, the inventor has developed the unique stator design for the electric motor of the present invention wherein each stator pole is formed with a main winding and at least one fractional-power winding, both of which are independently controlled. The system's microprocessor-based controller is used to selectively energize the independent winding drive circuits for the main and fractional-power windings in order to maintain the required RPM to drive the mechanism and to generate a minimum required torque output. By reducing the number of windings energized and/or their driven duty cycle, the amount of torque output can be reduced and thus the power consumption on the battery power source can be proportionally reduced, but yet still maintain mechanism speed and performance.

In a typical operating condition, all of the main and fractional-power windings are energized initially with a 100% duty cycle so that maximum torque will be generated to accelerate the driven mechanism. Then, certain main and/or fractional-power windings are selectively de-energized so as to reduce the output torque to any desired level. Alternatively, certain main and/or fractional-power windings are selectively energized with a gradually decreasing duty cycle so as to reduce the output torque. It should be apparent to those skilled in the art that the selection of the windings and the duty cycles can be varied in numerous combined ways so as to achieve any desired output torque and reduced power consumption. Further, in order to reduce the number of circuit components, common windings (i.e., main windings W1m and W3m) could be connected in parallel and then driven by a single winding drive circuit.

For instance, in FIG. 6(a)-6(l), there are shown timing diagrams of the voltage waveforms generated at the positive output terminals for each of the three phases so as to develop a reduced output torque on the rotor. As can be seen in FIGS. 6(c) through 6(l), all fractional-power windings are energized with full power or 100% duty cycle which is identical to the waveform in FIG. 5. Thus, all fractional-power windings W1f-W12f will provide their maximum torque output. However, the main windings W1m-W12m are energized with a reduced 25% duty cycle, so as to produce approximately 25% of their maximum torque output. Accordingly, if the size of the electric motor is assumed to be 20 HP, then the amount of total horsepower (THP) developed by the motor can be calculated as follows:

$$THP = (Mdc \times Mhp) + (Fdc \times Fhp)$$

where, Mdc=percentage of duty cycle of main winding; Mhp=maximum horsepower of main winding; Fdc= percentage of duty cycle of fractional-power winding; and Fhp=maximum horsepower of fractional-power winding.

Therefore, the total horsepower generated by the electric motor when operated in accordance with the voltage waveforms of FIGS. 6(a)-6(l) will be given by the following:

$$THP = (.25 \times 18) + (1.00 \times 2)$$
$$= (4.5) + (2) = 6.5 \text{ HP}$$

It will be noted that the generated torque and the power consumption at this level is only 35% of the full horsepower level at the driven RPM speed, resulting in increased efficiency. Consequently, the electric motor of the present invention can substantially reduce the amount of power consumption on the battery-powered source while maintaining the mechanism RPM speed.

In another variation of the invention, two stators may be mounted and spaced axially from one another on the same shaft. One stator could comprise main windings as disclosed above while the second stator would comprise fractional-power windings as disclosed above. Both sets of windings could be similarly controlled as disclosed above and could react inductively with a single rotor piece or with mechanically axially spaced portions of a single rotor.

From the foregoing detailed description, it can thus be seen that the present invention provides an improved fractional-power high efficiency electric motor which includes a unique stator construction so as to provide variable torque control over a wide range of operating speeds and reduced power supply loading on a battery source.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A battery-powered electric motor for generating varying amounts of output torque supplied to a driven member at any constant RPM speed over a range of RPM speeds so as to maintain efficiency and to reduce power consumption on the battery-powered source comprising:

a rotor having an axis of rotation;

a stator assembly disposed around said rotor and being inductively coupled to said rotor;

said stator assembly having a plurality of stator phases;

each of said stator phases having a plurality of poles;

each of said stator poles having at least one main winding and at least one fractional-power winding;

said main winding and said associated at least one fractional-power winding on each of said stator poles being wound so that the magnetic flux generated in said associated fractional-power winding will be added to the magnetic flux generated by said main winding to produce an increased magnetic field strength;

power switching means for energizing said main and said fractional-power windings on each of said stator poles;

said power switching means being formed of a plurality of winding drive circuits each one being associated with one of said main windings and said fractional-power windings for independently energizing said main windings and said fractional-power windings;

said plurality of winding drive circuits including an input terminal connected to the battery source and output terminals for producing A.C. voltage pulses across said windings;

controller means for selectively controlling said power switching means to vary the rotational speed of said rotor and the amounts of torque supplied to the driven member;

said controller means being coupled to each of said plurality of winding drive circuits for varying the duty cycle of said A.C. voltage pulses defining a pulse-width modulated waveform; and each of said plurality of winding drive circuits being formed of a plurality of switching devices connected in a H-bridge network across said battery source, said predetermined pair of said switching devices being turned on and off for producing said A.C. voltage pulses with alternating polarity and predetermined width.

2. An electric motor as claimed in claim 1, further comprising a plurality of fractional-power windings disposed on each of said stator poles.

3. An electric motor as claimed in claim 1, wherein said main winding and said at least one fractional-power winding on each of said stator poles are initially energized so as to increase the RPM speed and output torque of said rotor to a full power level and wherein one or more of said main and fractional-power windings are thereafter de-energized so as to reduce the output torque to any desired level.

4. An electric motor as claimed in claim 1, wherein one or more of selected main and fractional-power windings are gradually de-energized by decreasing the pulse width to reduce the duty cycle thereof so as to reduce the output torque to any desired level.

5. An electric motor as claimed in claim 1, further comprising sensing means for detecting the rotational speed of the driven member to produce a feedback signal to said controller means.

6. An electric motor as claimed in claim 1, wherein said plurality of stator poles within each of said stator phases comprises two or more poles which are equally displaced from one another about said axis of rotation of said rotor.

7. An electric motor as claimed in claim 1, wherein said main windings and said fractional-power windings are displaced from one another along said axis of rotation of said rotor.

8. An electric motor as claimed in claim 1, wherein said fractional-power windings have a lower magnetic field strength than the field strength of said main windings.

9. A method for controlling varying amounts of output torque supplied to a driven member at any constant RPM over a range of RPM speeds by a battery-powered electric motor system so as to reduce power consumption on the battery-powered source comprising the steps of:

providing a plurality of stator poles within a plurality of stator phases around a rotor;

connecting a main winding and at least one fractional-power winding on each of said stator poles;

winding the main winding and the associated at least one fractional-power winding within each of the stator poles so that the magnetic fluxes generated therefrom will be added;

independently switching the main and the fractional-power windings within each of the stator poles through a plurality of winding drive control circuits each one being associated with one of the main windings and the fractional-power windings;

connecting an input terminal of the plurality of winding drive control circuits to the battery source and generating A.C. voltage pulses across the windings through its output terminals;

selectively controlling the energization of the main and the fractional-power windings to vary the rotational speed of the rotor and the amounts of torque supplied to the driven member;

varying the duty cycle of the A.C. voltage pulses so as to define a pulse-width modulated waveform;

the plurality of winding drive control circuits being formed of a plurality of transistors connected in a H-bridge network across the battery source, and turning on and off a predetermined pair of the transistors to generate the A.C. voltage pulses with alternating polarity and predetermined width.

10. A method as claimed in claim 9, further comprising the step of disposing a plurality of fractional-power windings on each of the stator poles.

11. A method as claimed in claim 9, further comprising the step of initially energizing the main winding and the at least one fractional-power winding within each of the stator poles so as to increase the RPM speed and output torque of the rotor to a full power level and thereafter de-energizing one or more of selected main and fractional-power windings so as to reduce the output torque to any desired level.

12. A method as claimed in claim 9, further comprising the step of gradually de-energizing one or more of selected main and fractional-power windings by decreasing the duty cycle of A.C. voltage pulses.

13. A method as claimed in claim 9, further comprising the step of sensing the rotational speed of the driven member and the output torque generated to produce a feedback signal.

14. A battery-powered electric motor for generating varying amounts of output torque supplied to a driven member at any constant RPM over a range of RPM speeds so as to reduce power consumption on the battery-powered source comprising:

a rotor having an axis of rotation;

a stator assembly disposed around said rotor and being inductively coupled to said rotor;

said stator assembly having a plurality of poles;

each of said stator poles having a main winding and at least one fractional-power winding, said at least one fractional-power winding having a lower magnetic field strength than said main winding;

said main winding and said associated at least one fractional-power winding on each of said stator poles being wound so that the magnetic flux generated in said associated fractional-power winding will be added to the magnetic flux generated by said main winding to produce an increased magnetic field strength;

power switching means for independently energizing said main and said fractional-power windings on each of said stator poles; and means for selectively controlling the energization of said power switching means so that said main and said fractional-power windings on each of said stator poles can vary the rotational speed of said rotor and the amounts of torque supplied to the driven member.

15. An electric motor as claimed in claim 14, wherein the plurality of stator poles comprising all main windings are contained in one stator around one rotor and the plurality of stator poles comprising all fractional-power windings are contained in a second stator around a second rotor and wherein the plurality of additional main or fractional-power windings are contained in additional stators around additional rotors which are all connected to a single mechanical shaft.

16. An electric motor as claimed in claim 14, wherein a portion of the plurality of stator poles comprising main and/or fractional-power windings are contained in one stator around one rotor and the remaining portion of the plurality of stator poles comprising main and/or fractional-power windings are contained in a second stator around a second rotor and wherein additional main and/or fractional-power windings are contained in additional stators around additional rotors which are all connected to a single mechanical shaft.

* * * * *